E. D. SHANTON & S. SHAVER.
Devices for Cooling Millstones.
No. 138,050. Patented April 22, 1873.
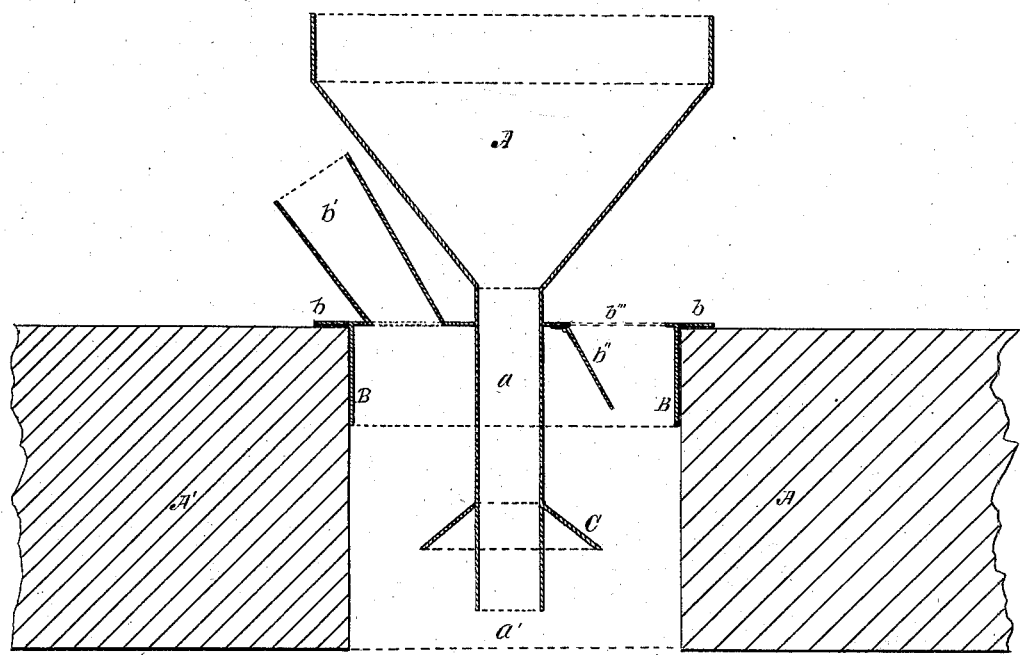

UNITED STATES PATENT OFFICE.

EDWARD D. SHANTON AND SILAS SHAVER, OF MINNEAPOLIS, MINNESOTA.

IMPROVEMENT IN DEVICES FOR COOLING MILLSTONES.

Specification forming part of Letters Patent No. 138,050, dated April 22, 1873; application filed December 17, 1872.

*To all whom it may concern:*

Be it known that we, EDWARD D. SHANTON and SILAS SHAVER, of Minneapolis, in the county of Hennepin, in the State of Minnesota, have made certain Improvements in the Mode of Cooling Millstones while Grinding Grain, of which the following is a specification:

The object of this invention is to keep the millstones cool, or, if heated, will furnish the means of cooling them; and it consists in the construction of the device by which the cool air is conducted in between the millstones with the grain being ground, as will more fully hereinafter be described.

In the drawing, A represents a funnel-shaped receiver, into which the grain falls from the feeding-shoe of the hopper, and is then conducted by the pipe $a$ into the eye $a'$ of the runner-millstone $A'$, in the usual manner. B is a circular box fast on tube $a$, having a cover with a projecting flange, $b$. The body of the box is of the size in diameter to nearly fill the eye $a'$ of the stone, but allows the stone to revolve freely and the box not to touch the wall of the eye in the stone, while the projecting flange $b$ of the cover projects over the eye by being of greater diameter than the eye, and the flange $b$ raised so that the top of the millstone will not strike it when in revolution. $b'$ is an air-conducting tube going through the top of box B, and is supplied with cool air from an air-conduit in any convenient location and where the air is forced in for the purpose of being conducted in between the millstones. $b''$ is a flap valve or door hinged at its inner side and allowed to freely swing downward into the body of box B. It is located in the top of box B and on opposite side of the feed-tube $a$ from the air inlet-tube $b$, and closes opening $b'''$ on the top of box B. C is a conical-shaped flange fast on the feed-tube $a$ below box B, and of less diameter than the eye $a'$ in the millstone.

Operation.

The cool air is forced through an air-trunk to supply any number of pairs of millstones in the grinding-loft by air-conducting tube at convenient points to conduct the air into box B through air-tube $b$, when the air will be forced down through the eye $a'$ to mingle with the grain fed through tube $a$, thence with the grain into the furrows of the stones to be distributed in contact with the grinding-surfaces thereof, and pass out from between the stones with the completely ground meal of the wheat or grain, keeping the surface of the stones and grain or meal cool during the process of grinding.

By keeping the millstones cool no heat is generated, and, as a consequence, more grain can be ground in the same time by the same power, will be better and more evenly ground, and less loss in weight by the operation of grinding. When the millstones become heated from any cause the grain ground between them must by necessity also be heated, and, when so heated, gas is evolved from the grain, and in escaping carries with it some of the finely pulverized particles of the meal, which takes from the weight as well as from the quality of the flour.

The flap valve or door $b''$ is for the purpose of letting air into the eye $a'$ of the millstone when, for any cause, the current of air being forced in through air-tube $b'$ is stopped, as then the weight of the surrounding atmosphere would force down the valve and supply air to the millstones, but when the air is forced through tube $b$ the pressure of the same will keep the valve $b'$ closed. The projecting conical flange C will, whenever the millstone $A'$ is stopped, and the current of air through tube $b'$ not stopped, prevent the blowing out of the eye of the stone the grain that has been fed through the tube $a$ and in the eye $a'$.

Having thus described our invention, what we claim, and desire to secure by Letters Patent, is—

1. The box R having the flap-valve $b''$, in combination with the feeding-tube $a$, constructed, arranged, and operating substantially in the manner described.

2. The box B having the air-inlet tube $b'$, in combination with the feeding-tube $a$ having the projecting conical flange C, constructed, arranged, and operating substantially as and for the purpose described.

EDWARD D. SHANTON.
SILAS SHAVER.

Witnesses:
ROBERT S. BRYANT,
CHAS. H. WOOD.